(12) United States Patent
Takahashi et al.

(10) Patent No.: US 10,749,558 B2
(45) Date of Patent: Aug. 18, 2020

(54) TERMINAL AND COMMUNICATION METHOD IN A MULTI USER-MULTIPLE INPUT MULTIPLE OUTPUT (MU-MIMO) SCHEME

(71) Applicant: Panasonic Intellectual Property Management Co., Ltd., Osaka (JP)

(72) Inventors: Ryo Takahashi, Miyagi (JP); Takashi Ouchi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/366,569

(22) Filed: Mar. 27, 2019

(65) Prior Publication Data

US 2019/0222246 A1 Jul. 18, 2019

Related U.S. Application Data

(63) Continuation of application No. PCT/JP2016/005162, filed on Dec. 16, 2016.

(30) Foreign Application Priority Data

Oct. 18, 2016 (JP) ................. 2016-204504

(51) Int. Cl.
| | | |
|---|---|---|
| H04B 1/12 | (2006.01) | |
| H04B 1/10 | (2006.01) | |
| H04B 7/0452 | (2017.01) | |
| H04B 7/04 | (2017.01) | |
| H04W 16/28 | (2009.01) | |

(52) U.S. Cl.
CPC ........... *H04B 1/126* (2013.01); *H04B 1/1027* (2013.01); *H04B 7/04* (2013.01); *H04B 7/0452* (2013.01); *H04W 16/28* (2013.01)

(58) Field of Classification Search
CPC ........ H04B 1/126; H04B 7/04; H04B 7/0452; H04B 1/1027; H04B 7/0854; H04W 16/28
See application file for complete search history.

(56) References Cited

U.S. PATENT DOCUMENTS

| | | | | |
|---|---|---|---|---|
| 2013/0208654 A1* | 8/2013 | Fujii | ............... | H04B 7/026 370/315 |
| 2016/0373204 A1* | 12/2016 | Yamada | ............... | H04J 11/00 |
| 2018/0048363 A1* | 2/2018 | Okuyama | ............ | H04B 7/0456 |

FOREIGN PATENT DOCUMENTS

| | | |
|---|---|---|
| JP | 07-066739 A | 3/1995 |
| JP | 2009-141957 A | 6/2009 |
| JP | 2014-075679 A | 4/2014 |

* cited by examiner

*Primary Examiner* — Afshawn M Towfighi
(74) *Attorney, Agent, or Firm* — Seed IP Law Group LLP

(57) ABSTRACT

A terminal includes: a radio receiver, which, in operation receives a plurality of data signals transmitted from a base station by a multi user-multiple input multiple output (MU-MIMO) scheme, the plurality of data signals being spatially multiplexed; an inter-user interference power estimator, which, in operation estimates inter-user interference power based on a transmission weight of another terminal with which the MU-MIMO scheme is performed; and a signal separator, which, in operation generates a reception weight based on the inter-user interference power and separates the plurality of data signals from each other based on the reception weight.

8 Claims, 7 Drawing Sheets

TERMINAL AND COMMUNICATION METHOD IN A MULTI USER-MULTIPLE INPUT MULTIPLE OUTPUT (MU-MIMO) SCHEME

This application is a continuation application of PCT International Application No. PCT/JP2016/005162 filed on Dec. 16, 2016, which claims the benefit of foreign priority of Japanese patent application 2016-204504 filed on Oct. 18, 2016, the contents all of which are incorporated herein by reference.

BACKGROUND

1. Technical Field

The disclosure relates to a terminal and a communication method.

2. Description of the Related Art

In the LTE-Advanced system standardized in the 3rd generation partnership project (3GPP), a method of avoiding interference between users by performing transmission beamforming in downlink multi user-multiple input multiple output (MU-MIMO) is examined.

In MU-MIMO, firstly, a plurality of terminals (may be referred to as pieces of user equipment (UE) or mobile stations (MS)) performs channel estimation based on a channel state information reference signal (CSI-RS) regarding channels between a plurality of transmission antennae in a base station (may be referred to as an eNB or a BS) and a plurality of reception antennae in each of the plurality of terminals, and feeds back the channel estimation value (CSI) to the base station. Then, the base station calculates a transmission weight based on the CSI fed back from each of the terminals. The base station spatially multiplexes downlink data signals (PDSCH: Physical Downlink Shared Channel) and demodulation reference signals (DM-RS) for the plurality of terminals based on transmission weights, and transmits the signals obtained by the spatial multiplexing, to the terminals, respectively.

The CSI-RS used in channel estimation processing of a terminal is transmitted at a predetermined cycle (for example, cycle of five subframes (5 msec) in minimum) in a time domain.

The CSI-RS is disposed at a predetermined frequency interval in a frequency domain. Thus, for example, in a case where the CSI-RS is disposed at an interval of 12 subcarriers, a channel estimation value obtained by estimation of the terminal is obtained at the interval of 12 subcarriers.

In order to reduce the volume of information fed back to the base station from a terminal, the channel estimation value may be averaged in a plurality of subcarriers and then be fed back. For example, a channel estimation value averaged in a unit of subband (36 subcarriers in a system bandwidth of 10 MHz) is fed back.

In the above case, the base station generates the transmission weight based on the channel estimation value fed back in the unit of subband. In this case, a method (referred to as Method 1) using the same transmission weight for subcarriers in a subband and a method (referred to as Method 2) using a transmission weight for each subcarrier by performing linear interpolation or the like on the transmission weight in a unit of subband may be performed in the base station (for example, see Japanese Patent Unexamined Publication No. 2014-75679).

SUMMARY

One non-limiting and exemplary embodiment facilitates providing a terminal and a communication method that can reduce inter-user interference while suppressing an increase of the calculation quantity.

In one general aspect, the techniques disclosed here feature a terminal including: a receiver, which, in operation receives a plurality of data signals transmitted from a base station by a multi user-multiple input multiple output (MU-MIMO) scheme, the plurality of data signals being spatially multiplexed; an estimator, which, in operation estimates inter-user interference power based on a transmission weight of another terminal with which the MU-MIMO scheme is performed; and signal separator, which, in operation generates a reception weight based on the inter-user interference power and separates the plurality of data signals from each other based on the reception weight.

In another general aspect, the techniques disclosed here feature a communication method including: receiving a plurality of data signals transmitted from a base station by a multi user-multiple input multiple output (MU-MIMO) scheme, the plurality of data signals being spatially multiplexed; estimating inter-user interference power based on a transmission weight of another terminal with which the MU-MIMO scheme is performed; and generating a reception weight based on the inter-user interference power and separating the plurality of data signals from each other based on the reception weight.

According to an aspect of the disclosure, it is possible to reduce user-interference while suppressing an increase of a calculation quantity. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prior to providing a specific description of exemplary embodiments of the present disclosure, underlying knowledge forming a basis of the exemplary embodiments will be described. In Method 1 in Japanese Patent Unexamined Publication No. 2014-75679, the transmission weight is controlled in a unit of subband. Thus, in a case where a frequency fluctuates largely, as in a multipath environment, in a control granularity (sections to which the same transmission weight is applied), the accuracy of the transmission weight with respect to the practical frequency characteristics is lowered. Thus, inter-user interference is not reduced, and receiving performance deteriorates. In Method 2 in Japanese Patent Unexamined Publication No. 2014-75679, since a transmission weight is controlled in a subcarrier unit, the calculation quantity increases.

Hereinafter, exemplary embodiments according to an aspect of the disclosure will be described in detail with reference to the drawings.

Exemplary Embodiment 1

[Outline of Communication System]

Figure 1:
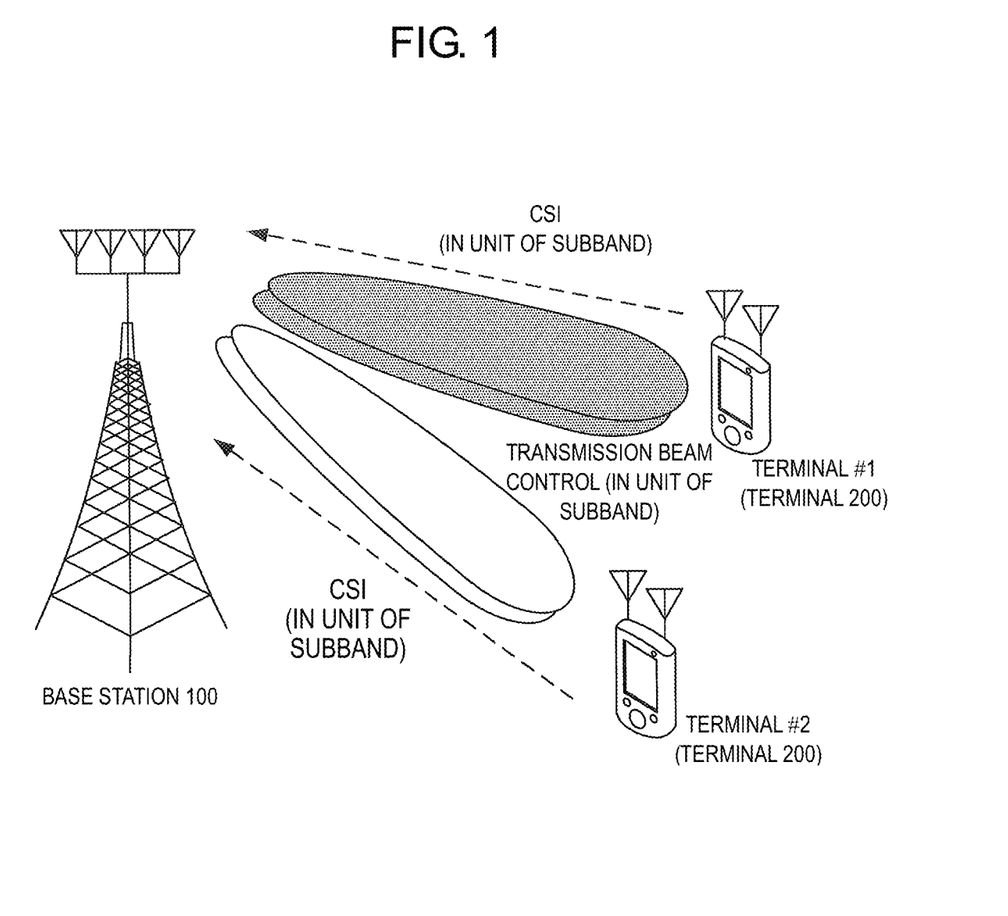
FIG. 1 is a diagram illustrating an example of configuration of a communication system according to Exemplary Embodiment 1.

FIG. 1 illustrates an example of configuration of a communication system according to an exemplary embodiment. The communication system illustrated in FIG. 1 includes at least base station 100 and plurality of terminals 200 (in FIG. 1, terminal #1 and terminal #2). Base station 100 calculates a transmission weight based on CSI fed back from each of terminals 200. Base station 100 spatially multiplexes a downlink signal for each of terminals 200 based on the transmission weight and transmits the downlink signal subjected to spatial multiplexing. Terminal 200 feeds back a channel estimation value (CSI) to base station 100 in a unit of subband. Base station 100 generates the transmission weight in the unit of subband, that is, performs transmission beam control in the unit of subband. Each of terminals 200 receives a plurality of data signals which has been transmitted from base station 100 by a MU-MIMO scheme and been spatially multiplexed.

In the communication system illustrated in FIG. 1, a downlink signal from base station 100 toward terminal #1 acts as an interfering signal for terminal #2. Similarly, a downlink signal from base station 100 toward terminal #2 acts as an interfering signal for terminal #1.

[Configuration of Base Station 100]

Figure 2:
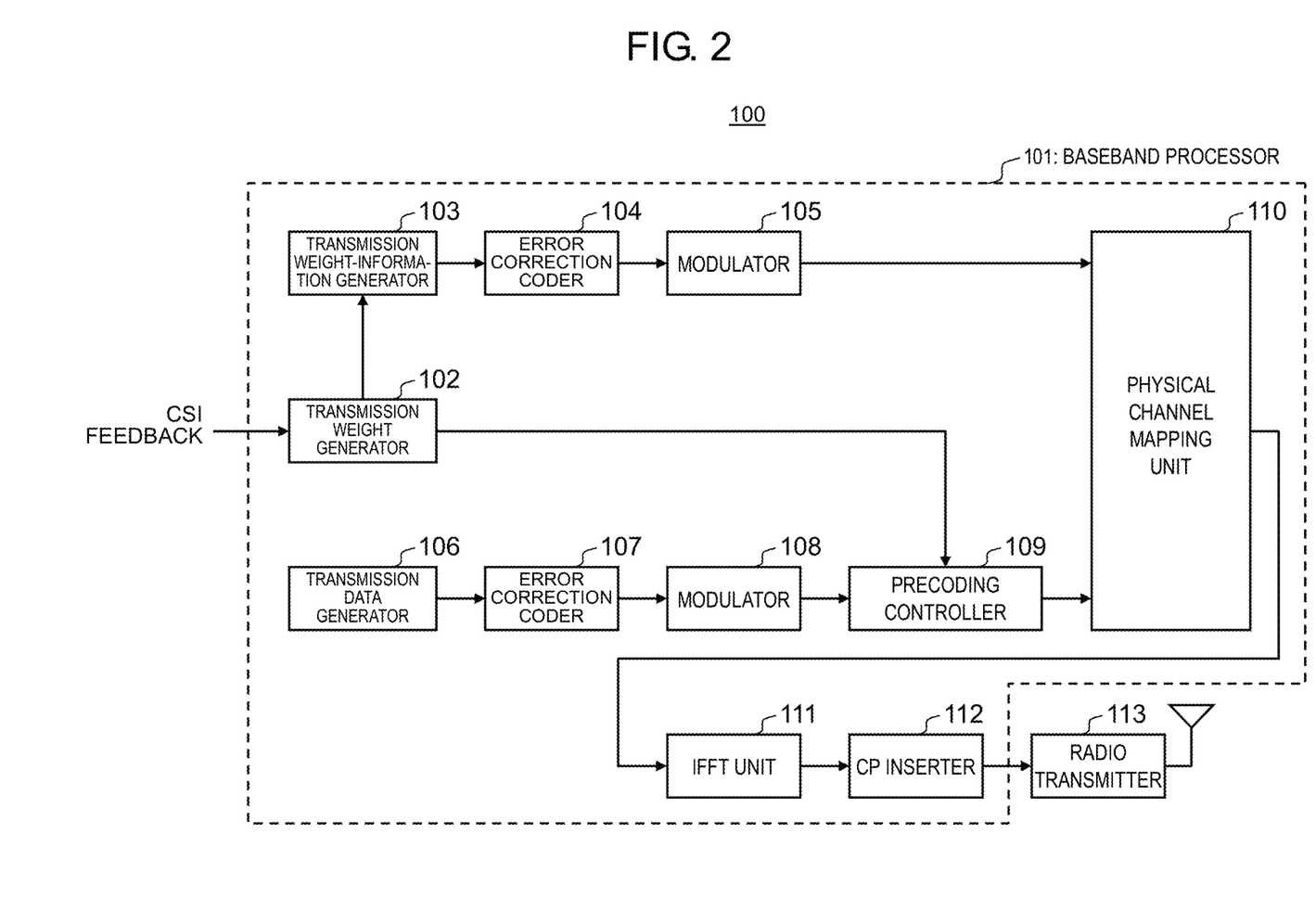
FIG. 2 is a block diagram illustrating an example of configuration of a base station according to Exemplary Embodiment 1.

FIG. 2 is a block diagram illustrating an example of a configuration of base station 100 according to the exemplary embodiment. In FIG. 2, illustrations are made focusing on components relating to the aspect of the disclosure among components of base station 100.

Base station 100 includes baseband processor 101 and radio transmitter 113. Baseband processor 101 includes transmission weight generator 102, transmission weight-information generator 103, error correction coder 104, modulator 105, transmission data generator 106, error correction coder 107, modulator 108, precoding controller 109, physical channel mapping unit 110, inverse fast Fourier transform (IFFT) unit 111, and cyclic prefix (CP) inserter 112.

Transmission weight generator 102 generates a transmission weight (for example, transmission weight in a unit of subband) based on the channel estimation value (CSI) fed back from each of plurality of terminals 200. Examples of a calculation algorithm of the transmission weight include a zero-forcing (ZF) method using an inverse matrix of a channel estimation value, a minimum mean square error (MMSE) method obtained by adding a noise power term to the ZF method, and a block diagonalization (BD) method using an eigenvector corresponding to a noise subspace by performing singular value decomposition on a channel estimation value. Transmission weight generator 102 outputs information (hereinafter, transmission weight information) indicating the generated transmission weight, to transmission weight-information generator 103 and precoding controller 109.

Transmission weight-information generator 103 generates a control signal including the transmission weight information input from transmission weight generator 102. Transmission weights for other terminals 200, which are transmitted by a MU-MIMO scheme are included in the transmission weight information for each terminal 200. Transmission weight-information generator 103 outputs the control signal including the transmission weight information to error correction coder 104.

Error correction coder 104 performs error correction coding on the control signal input from transmission weight-information generator 103 and outputs the coded control signal to modulator 105.

Modulator 105 modulates the control signal input from error correction coder 104 and outputs the modulated control signal to physical channel mapping unit 110.

Transmission data generator 106 generates transmission data (downlink data signal) for each terminal 200 and outputs the generated transmission data to error correction coder 107.

Error correction coder 107 performs error correction coding on the transmission data input from transmission data generator 106 and outputs the coded transmission data to modulator 108.

Modulator 108 modulates the transmission data input from error correction coder 107 and outputs the modulated transmission data to precoding controller 109.

Precoding controller 109 performs precoding on a DM-RS and the transmission data input from modulator 108, for each terminal 200 based on the transmission weight input from transmission weight generator 102. Precoding controller 109 outputs the signal and data subjected to precoding, to physical channel mapping unit 110.

Physical channel mapping unit 110 maps the control signal input from modulator 105 and the signal input from precoding controller 109, on predetermined physical channel resources. Physical channel mapping unit 110 maps the CSI-RS on predetermined resources (not illustrated). Physical channel mapping unit 110 outputs the signal after mapping, to IFFT unit 111.

IFFT unit 111 performs IFFT processing on the signal input from physical channel mapping unit 110, and thereby converts a frequency domain signal into a time domain signal. IFFT unit 111 outputs the time domain signal to CP inserter 112.

CP inserter 112 inserts a CP into the signal input from IFFT unit 111 and outputs the signal (for example, referred to as an orthogonal frequency division multiplexing (OFDM) signal) after the insertion of the CP, to radio transmitter 113.

Radio transmitter 113 performs radio frequency (RF) processing such as D/A conversion and up-conversion, on the signal input from CP inserter 112. Radio transmitter 113 transmits a radio signal to each terminal 200 through an antenna. As described above, a downlink signal transmitted from base station 100 is transmitted in a state where a plurality of streams is spatially multiplexed.

[Configuration of Terminal 200]

Figure 3:
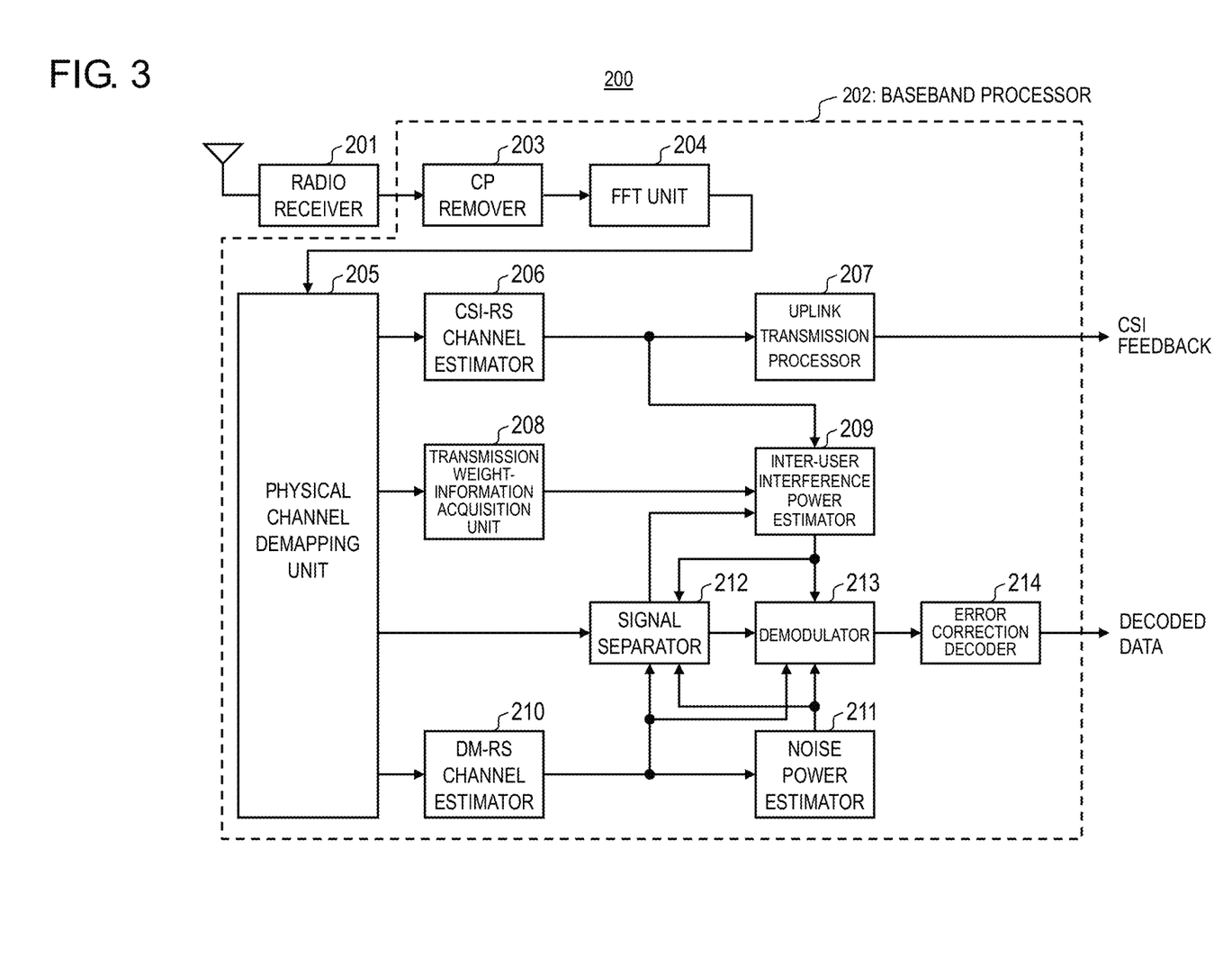
FIG. 3 is a block diagram illustrating a configuration of a terminal according to Exemplary Embodiment 1.

FIG. 3 is a block diagram illustrating an example of a configuration of terminal 200 according to the exemplary embodiment. In FIG. 3, illustrations are made focusing on components relating to the aspect of the disclosure among components of terminal 200.

Terminal 200 includes radio receiver 201 and baseband processor 202. Baseband processor 202 includes CP remover 203, fast Fourier transform (FFT) unit 204, physical channel demapping unit 205, CSI-RS channel estimator 206, uplink transmission processor 207, transmission weight-information acquisition unit 208, inter-user interference power estimator 209, DM-RS channel estimator 210, noise power estimator 211, signal separator 212, demodulator 213, and error correction decoder 214.

Radio receiver 201 performs RF processing such as down-conversion and AM conversion on a radio signal received through an antenna and outputs a reception signal obtained by the RF processing to CP remover 203.

CP remover 203 removes a CP being inserted into the reception signal input from radio receiver 201 and outputs a signal obtained by removing the CP, to FFT unit 204.

FFT unit 204 performs FFT processing on the signal input from CP remover 203, and thereby converts a time domain signal into a frequency domain signal. FFT unit 204 outputs the frequency domain signal to physical channel demapping unit 205.

Physical channel demapping unit 205 extracts a downlink data signal, a control signal (including transmission weight information), a CSI-RS, and a DM-RS from the signal input from FFT unit 204. Physical channel demapping unit 205 outputs the downlink data signal to signal separator 212, outputs the control signal to transmission weight-information acquisition unit 208, outputs the CSI-RS to CSI-RS channel estimator 206, and outputs the DM-RS to DM-RS channel estimator 210.

CSI-RS channel estimator 206 calculates a channel estimation value (referred to as CSI or a CSI channel estimation value) based on the CSI-RS input from physical channel demapping unit 205. CSI-RS channel estimator 206 outputs the CSI channel estimation value to uplink transmission processor 207 and inter-user interference power estimator 209.

Uplink transmission processor 207 performs transmission processing on the CSI channel estimation value input from CSI-RS channel estimator 206 and feeds back the CSI channel estimation value obtained after the transmission processing, to base station 100.

Transmission weight-information acquisition unit 208 acquires transmission weight information from the control signal input from physical channel demapping unit 205. Transmission weight-information acquisition unit 208 outputs the acquired transmission weight information to inter-user interference power estimator 209.

Inter-user interference power estimator 209 estimates interference power (that is, inter-user interference power) that affects a signal for the own terminal caused by a signal for another terminal 200. The estimation is performed based on the CSI channel estimation value input from CSI-RS channel estimator 206, and a transmission weight of another terminal 200, which is input from transmission weight-information acquisition unit 208 and is transmitted by a MU-MIMO scheme. Inter-user interference power estimator 209 uses a reception weight generated by signal separator 212 described later, when estimating inter-user interference power used in generation of a soft decision weight described later. Inter-user interference power estimator 209 outputs the estimated inter-user interference power to signal separator 212 and demodulator 213.

DM-RS channel estimator 210 calculates a channel estimation value (referred to as a DM-RS channel estimation value hereinafter) based on the DM-RS input from physical channel demapping unit 205. DM-RS channel estimator 210 outputs the DM-RS channel estimation value to noise power estimator 211, signal separator 212, and demodulator 213.

Noise power estimator 211 estimates noise power based on the DM-RS channel estimation value input from DM-RS channel estimator 210 and outputs the estimated noise power to signal separator 212 and demodulator 213.

Signal separator 212 separates the reception signal (downlink data signal) input from physical channel demapping unit 205 into a plurality of signals (streams). The separation is performed based on the inter-user interference power input from inter-user interference power estimator 209, the DM-RS channel estimation value input from DM-RS channel estimator 210, and the noise power input from noise power estimator 211. Specifically, signal separator 212 generates a reception weight (for example, MMSE reception weight) based on the inter-user interference power, the DM-RS channel estimation value, and the noise power. Signal separator 212 separates the signal by multiplying the reception signal by the reception weight. Signal separator 212 outputs the signals obtained by the separation and the reception weight to demodulator 213 and outputs the reception weight to inter-user interference power estimator 209.

Demodulator 213 performs demodulation and soft decision processing based on the reception weight input from signal separator 212, the user interference power input from inter-user interference power estimator 209, the DM-RS channel estimation value input from DM-RS channel estimator 210, and the noise power input from noise power estimator 211.

Specifically, demodulator 213 demodulates the signal input from signal separator 212 so as to calculate a soft decision value (likelihood sequence). Demodulator 213 generates the soft decision weight (for example, signal to interference and noise ratio (SINR)) based on the reception weight, the DM-RS channel estimation value, the inter-user interference power, and the noise power. Demodulator 213 performs weighting by multiplying the soft decision value by the soft decision weight. For example, the soft decision weight has a value increasing as inter-user interference becomes smaller and has a value decreasing as the inter-user interference becomes larger. Demodulator 213 outputs the weighted soft decision value to error correction decoder 214.

Error correction decoder 214 performs error correction decoding on the soft decision value which has been weighted and is input from demodulator 213, and outputs a signal (that is, decoded data of a desired signal) obtained after the decoding.

[Operations of Base Station 100 and Terminal 200]

Next, operation of base station 100 and terminal 200 described above will be described.

<Methods of Generating Reception Weight and Soft Decision Weight>

Firstly, methods of generating the reception weight and the soft decision weight generated by signal separator 212 and demodulator 213 in terminal 200 will be described in detail.

Figure 4:
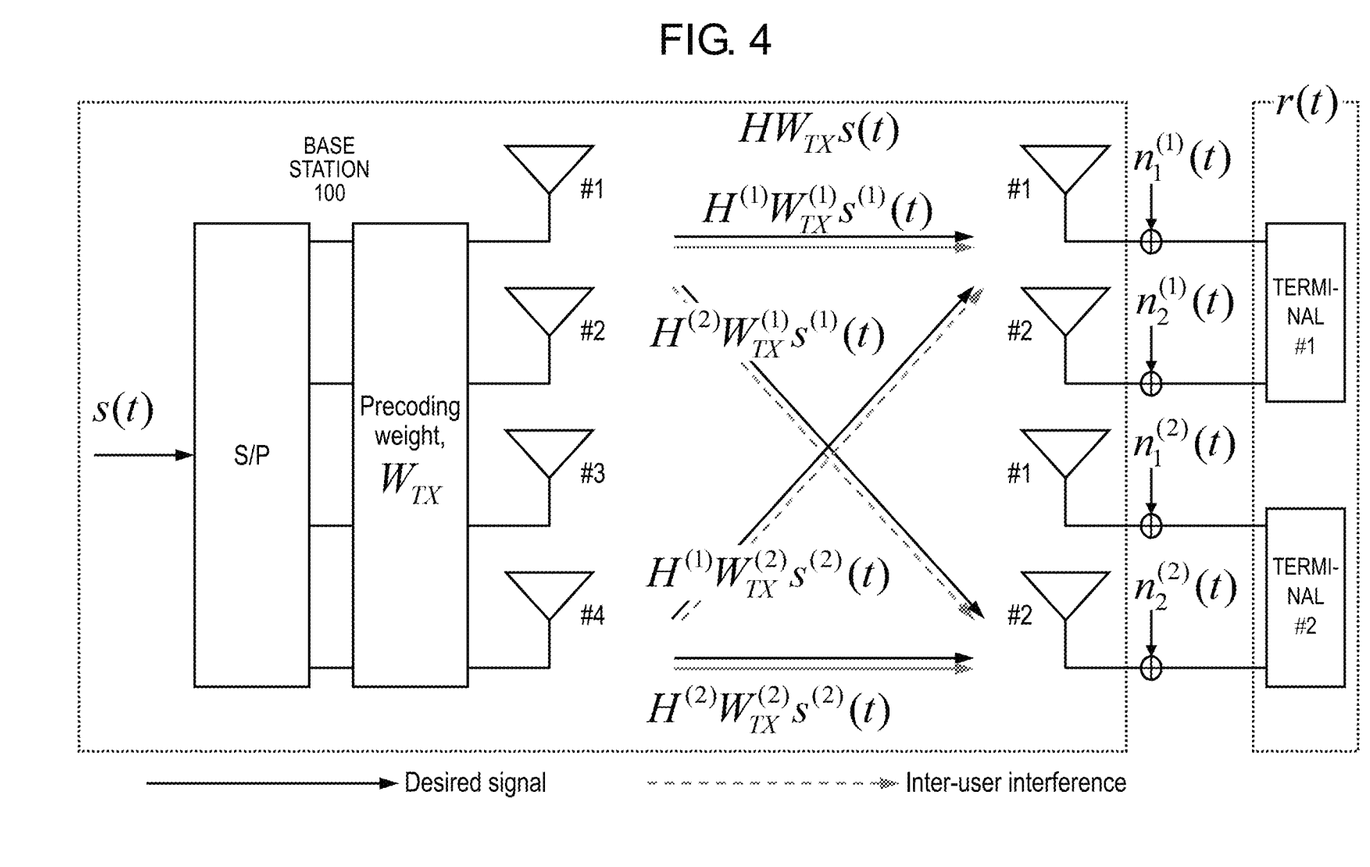
FIG. 4 is a diagram illustrating an example of MU-MIMO operation according to Exemplary Embodiment 1.

As an example, as illustrated in FIG. 4, a case where base station 100 includes four transmission antennae #1 to #4, each of terminals 200 (terminal #1 and terminal #2) includes two reception antennae #1 and #2, and spatial multiplexing is performed by a MU-MIMO scheme of 4Tx×2Rx×2UE will be described below. The number of transmission or reception antennae used in MU-MIMO spatial multiplexing between base station 100 and the plurality of terminals 200 is not limited thereto.

Firstly, a general example of generating the reception weight and the soft decision weight will be described. In practice, the reception weight and the soft decision weight are defined in a unit of a subcarrier and an OFDM symbol (that is, resource element (RE) unit). However, here, the unit will not be described for simple descriptions.

A reception signal r (corresponding to an arrow indicated by a solid line in FIG. 4) received from the base station by each terminal in a case where inter-user interference does not occur is defined by Expression (1).

[Expression 1]

$$r = HW_{TX}s + n = \begin{bmatrix} H^{(1)}W_{TX}^{(1)}s^{(1)} + n^{(1)} \\ H^{(2)}W_{TX}^{(2)}s^{(2)} + n^{(2)} \end{bmatrix} \quad (1)$$

Here, $H^{(1)}$ and $H^{(2)}$ indicate channel responses representing channels between the base station and terminal #1 and between the base station and terminal #2. $W_{TX}^{(1)}$ and $W_{TX}^{(2)}$ indicate transmission weights for the terminals #1 and #2, respectively. $s^{(1)}$ and $s^{(2)}$ indicate transmission signals (desired signals) for the terminals #1 and #2, respectively. $n^{(1)}$ and $n^{(2)}$ indicate noise in the terminals #1 and #2, respectively. The above factors are represented by Expressions (2) to (5).

[Expression 2]

$$H = [(H^{(1)})^T (H^{(2)})^T]^T \quad (2)$$

[Expression 3]

$$W_{TX} = [W_{TX}^{(1)} W_{TX}^{(2)}] \quad (3)$$

[Expression 4]

$$s = [(s^{(1)})^T (s^{(2)})^T]^T \quad (4)$$

[Expression 5]

$$n = [(n^{(1)})^T (n^{(2)})^T]^T \quad (5)$$

Descriptions will be made below on the assumption that channel response H' is represented by $HW_{TX}$ in Expression (1). H' indicates a DM-RS channel estimation value estimated by a DM-RS in which the transmission weight $W_{TX}$ has been applied. Descriptions will be made below on the assumption that H and H' are estimation values.

For example, a reception weight (MMSE reception weight) $W_{RX}^{(1)}$ of terminal #1 is represented by Expression (6).

[Expression 6]

$$W_{RX}^{(1)} = ((H^{(1)}W_{TX}^{(1)})^H (H^{(1)}W_{TX}^{(1)}) + P_n^{(1)} I_{N_{RX}})^{-1} (H^{(1)} W_{TX}^{(1)})^H \quad (6)$$

Here, the superscript H indicates the Hermitian transpose operation. $P_n$ indicates noise power (for example, average value in a subframe). $I_{N_{RX}}$ indicates a unit matrix having a size corresponding to the number of reception antennae in the terminal. The reception weight of terminal #2 is calculated in a manner similar to Expression (6).

Terminal #1 multiplies the reception signal r (part corresponding to terminal #1 in Expression (1)) by the reception weight $W_{RX}^{(1)}$, and separates the signal into signals of two streams as in Expression (7).

[Expression 7]

$$W_{RX}^{(1)}(H^{(1)}W_{TX}^{(1)}s^{(1)} + n^{(1)}) = W_{RX}^{(1)}H'^{(1)}s^{(1)} +$$

$$W_{RX}^{(1)}n^{(1)} = \begin{bmatrix} wh_{11}'^{(1)} & wh_{12}'^{(1)} \\ wh_{21}'^{(1)} & wh_{22}'^{(1)} \end{bmatrix}\begin{bmatrix} s_1^{(1)} \\ s_2^{(1)} \end{bmatrix} + \begin{bmatrix} w_{11}^{(1)} & w_{12}^{(1)} \\ w_{21}^{(1)} & w_{22}^{(1)} \end{bmatrix}\begin{bmatrix} n_1^{(1)} \\ n_2^{(1)} \end{bmatrix} =$$

$$\begin{bmatrix} wh_{11}'^{(1)}s_1^{(1)} + wh_{12}'^{(1)}s_2^{(1)} + w_{11}^{(1)}n_1^{(1)} + w_{12}^{(1)}n_2^{(1)} \\ wh_{21}'^{(1)}s_1^{(1)} + wh_{22}'^{(1)}s_2^{(1)} + w_{21}^{(1)}n_1^{(1)} + w_{22}^{(1)}n_2^{(1)} \end{bmatrix} \quad (7)$$

A relationship between $W_{RX}^{(1)}H'^{(1)}$ and wh' in Expression (7) is defined by Expression (8).

[Expression 8]

$$W_{RX}^{(1)}H'^{(1)} = \begin{bmatrix} w_{11}^{(1)} & w_{12}^{(1)} \\ w_{21}^{(1)} & w_{22}^{(1)} \end{bmatrix}\begin{bmatrix} h_{11}'^{(1)} & h_{12}'^{(1)} \\ h_{21}'^{(1)} & h_{22}'^{(1)} \end{bmatrix} = \begin{bmatrix} wh_{11}'^{(1)} & wh_{12}'^{(1)} \\ wh_{21}'^{(1)} & wh_{22}'^{(1)} \end{bmatrix} \quad (8)$$

A soft decision weight (SINR) for each of the two streams shown in Expression (7) is represented by Expression (9).

[Expression 9]

$$SINR_1^{(1)} = \frac{|wh_{11}'^{(1)}|^2 |s_1^{(1)}|^2}{|wh_{12}'^{(1)}|^2 |s_2^{(1)}|^2 + |w_{11}^{(1)}|^2 |n_1^{(1)}|^2 + |w_{12}^{(1)}|^2 |n_2^{(1)}|^2} =$$

$$\frac{|wh_{11}'^{(1)}|^2}{|wh_{12}'^{(1)}|^2 + (|w_{11}^{(1)}|^2 + |w_{12}^{(1)}|^2) P_n^{(1)}}$$

$$SINR_2^{(1)} = \frac{|wh_{22}'^{(1)}|^2 |s_2^{(1)}|^2}{|wh_{21}'^{(1)}|^2 |s_1^{(1)}|^2 + |w_{21}^{(1)}|^2 |n_1^{(1)}|^2 + |w_{22}^{(1)}|^2 |n_2^{(1)}|^2} =$$

$$\frac{|wh_{22}'^{(1)}|^2}{|wh_{21}'^{(1)}|^2 + (|w_{21}^{(1)}|^2 + |w_{22}^{(1)}|^2) P_n^{(1)}} \quad (9)$$

In Expression (9), $|s_1|^2 = |s_2|^2 = 1$ and $|n_1|^2 = |n_2|^2 = P_n$.

Here, in soft decision weights $SINR_1^{(1)}$ and $SINR_2^{(1)}$ shown in Expression (9), $|wh'_{11}^{(1)}|^2$ and $|wh'_{22}^{(1)}|^2$ indicate desired signal power. $(|w_{11}^{(1)}|^2 + |w_{12}^{(1)}|^2)P_n^{(1)}$ and $(|w_{21}^{(1)}|^2 + |w_{22}^{(1)}|^2)P_n^{(1)}$ indicate noise power. $|wh'_{12}^{(1)}|^2$ and $|wh'_{21}^{(1)}|^2$ indicate interference power between the two streams in the same terminal.

Regarding two streams received by terminal #2, a soft decision weight (SINR) is calculated in a manner similar to Expression (9).

Next, an example of generating the reception weight and the soft decision weight in the exemplary embodiment will be described.

In the exemplary embodiment, terminal 200 generates a reception weight and a soft decision weight in consideration of inter-user interference power by a signal for another terminal in addition to the general parameters which are described above and are used in generating the reception weight and the soft decision weight.

Specifically, in a case of considering inter-user interference, reception signals r (corresponding to arrows indicated by the solid line and a dashed line in FIG. 4) received from base station 100 by each terminal 200 is defined by Expression (10).

[Expression 10]

$$r = HW_{TX}s + n = \begin{bmatrix} H^{(1)}W_{TX}^{(1)}s^{(1)} + H^{(1)}W_{TX}^{(2)}s^{(2)} + n^{(1)} \\ H^{(2)}W_{TX}^{(1)}s^{(1)} + H^{(2)}W_{TX}^{(2)}s^{(2)} + n^{(2)} \end{bmatrix} \quad (10)$$

In Expression (10) (see FIG. 4), $H^{(1)}W_{TX}^{(2)}s^{(2)}$ indicates inter-user interference from terminal #2 into terminal #1. $H^{(2)}W_{TX}^{(1)}s^{(1)}$ indicates inter-user interference from terminal #1 into terminal #2.

In this case, a reception weight $W_{RX}^{(1)}(k,l)$ in the k-th subcarrier and the l-th OFDM symbol, which is used in signal separator 212 of terminal #1 is represented by Expression (11).

[Expression 11]

$$W_{RX}^{(1)}(k,l) = ((H^{(1)}(k,l)W_{TX}^{(1)}(k,l))^H (H^{(1)}(k,l)W_{TX}^{(1)}(k,l)) + P_n^{(1)}I_{N_{RX}} + P_i^{(1)}(k,l))^{-1}(H^{(1)}(k,l)W_{TX}^{(1)}(k,l))^H \quad (11)$$

In Expression (11), $H^{(1)}(k,l)W_{TX}^{(1)}(k,l)$ indicates a DM-RS channel estimation value estimated by DM-RS channel estimator 210, and $P_n^{(1)}$ indicates noise power estimated by noise power estimator 211. In Expression (11), $P_i^{(1)}(k,l)$ indicates inter-user interference power estimated by inter-user interference power estimator 209 (that is, interference power received from a signal of terminal #2 by a signal of terminal #1). $P_i^{(1)}(k,l)$ is represented by Expressions (12) and (13).

[Expression 12]

$$P_i^{(1)}(k,l) = \begin{bmatrix} P_{i_1}^{(1)}(k,l) & 0 \\ 0 & P_{i_2}^{(1)}(k,l) \end{bmatrix} \quad (12)$$

[Expression 13]

$$\begin{bmatrix} P_{i_1}^{(1)}(k,l) \\ P_{i_2}^{(1)}(k,l) \end{bmatrix} = \mathrm{diag}\bigl((H^{(1)}(k,l)W_{TX}^{(2)}(k,l))(H^{(1)}(k,l)W_{TX}^{(2)}(k,l))^H\bigr) \quad (13)$$

In Expression (13), the function diag( ) indicates a diagonal matrix. In Expression (13), $H^{(1)}(k,l)$ indicates a channel estimation value (CSI) estimated by CSI-RS channel estimator 206. $W_{TX}^{(2)}(k,l)$ indicates a transmission weight of the terminal (referred to as an interference-applying terminal hereinafter. Here, terminal #2) applying interference to terminal #1. Here, the transmission weight is acquired from base station 100 by transmission weight-information acquisition unit 208.

In each terminal 200, the DM-RS channel estimation value $(H^{(1)}(k,l)W_{TX}^{(1)}(k,l))$ and the inter-user interference power $P_i$ are estimated in a unit of a subcarrier and an OFDM symbol (that is, a resource element unit). That is, terminal 200 estimates inter-user interference power in a unit of a subcarrier and an OFDM symbol and generates a reception weight $W_{RX}^{(1)}(k,l)$ based on the inter-user interference power in a unit of a subcarrier and an OFDM symbol. The noise power $P_n$ may be an average value in predetermined subcarriers and OFDM symbols, for example.

Signal separator 212 in terminal #1 multiplies the reception signal r (part corresponding to terminal #1 in Expression (1)) by the reception weight $W_{RX}^{(1)}(k,l)$ represented by Expression (11) and separates the signal into signals of two streams.

With Expression (11), it is understood that characteristics are closer to characteristics similar to those in the zero-forcing (ZF) method as the inter-user interference power $P_i$ becomes smaller and are closer to characteristics similar to those in a maximum ratio combining (MRC) method as the inter-user interference power $P_i$ becomes larger.

The soft decision weight (SINR) for each of the two streams obtained by separation based on the reception weight $W_{RX}^{(1)}(k,l)$ represented by Expression (11) is represented by Expression (14).

[Expression 14]

$$SINR_1^{(1)} = \frac{|wh_{11}'^{(1)}(k,l)|^2}{|wh_{12}'^{(1)}(k,l)|^2 + (|w_{11}^{(1)}(k,l)|^2 + |w_{12}^{(1)}(k,l)|^2)(P_n^{(1)} + P_{i_1}'^{(1)}(k,l))} \quad (14)$$

$$SINR_2^{(1)} = \frac{|wh_{22}'^{(1)}(k,l)|^2}{|wh_{21}'^{(1)}(k,l)|^2 + (|w_{21}^{(1)}(k,l)|^2 + |w_{22}^{(1)}(k,l)|^2)(P_n^{(1)} + P_{i_2}'^{(1)}(k,l))}$$

In Expression (14), $P'_{i_1}{}^{(1)}(k,l)$ and $P'_{i_2}{}^{(1)}(k,l)$ indicate inter-user interference power estimated by inter-user interference power estimator 209 (that is, interference power received from the signal of terminal #2 by the signal of terminal #1). $P'_{i_1}{}^{(1)}(k,l)$ and $P'_{i_2}{}^{(1)}(k,l)$ are represented by Expression (15). $P'_I$ used in generating the soft decision weight is different from inter-user interference power $P_i$ (Expressions (12) and (13)) used in generating the reception weight $W_{RX}^{(1)}(k,l)$ in that the reception weight $W_{RX}^{(1)}(k,l)$ is considered.

[Expression 15]

$$\begin{bmatrix} P_{i_1}'^{(1)}(k,l) \\ P_{i_2}'^{(1)}(k,l) \end{bmatrix} = \quad (15)$$

$$\mathrm{diag}\bigl((W_{RX}^{(1)}(k,l)H^{(1)}(k,l)W_{TX}^{(2)}(k,l))(W_{RX}^{(1)}(k,l)H^{(1)}(k,l)W_{TX}^{(2)}(k,l))^H\bigr)$$

With Expression (15), the soft decision weight increases as the inter-user interference power $P'_i$ becomes smaller. The soft decision weight decreases as the inter-user interference power $P'_i$ becomes larger. That is, as the inter-user interference power $P'_i$ becomes smaller, the correctness (that is, likelihood as a result of soft decision) of a desired signal received from base station 100 by terminal 200 is improved.

<Operation Example of Interference Reduction Processing>

Figure 5:
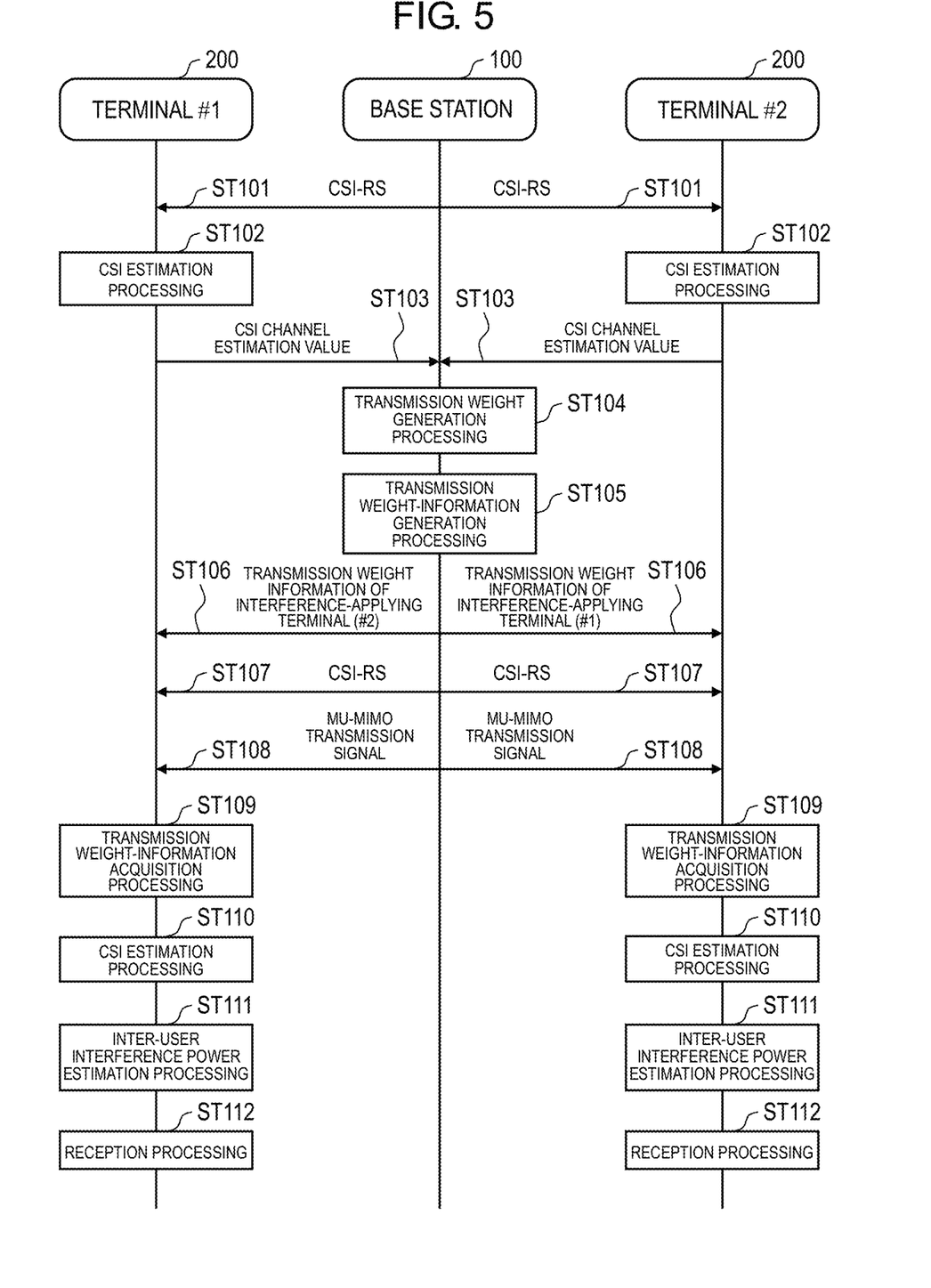
FIG. 5 is a sequence diagram illustrating interference reduction processing according to Exemplary Embodiment 1.

FIG. 5 is a sequence diagram illustrating operation in each device in the communication system illustrated in FIG. 1.

In FIG. 5, in Step (simply described as "ST" hereinafter) 101, base station 100 transmits a CSI-RS to each of terminals 200 (terminals #1 and #2).

In ST102, CSI-RS channel estimator 206 in each of terminals 200 calculates a CSI channel estimation value based on the CSI-RS received in ST101. In ST103, uplink transmission processor 207 in each of terminals 200 feeds the calculated CSI channel estimation value to base station 100.

In ST104, transmission weight generator 102 in base station 100 generates a transmission weight based on the CSI channel estimation value fed back from each of terminals 200. Here, the CSI channel estimation value is fed back, for example, in a unit of subband. Thus, the transmission weight is also generated in a unit of subband.

In ST105, transmission weight-information generator 103 in base station 100 generates transmission weight information indicating the transmission weight generated in ST104. Specifically, base station 100 generates transmission weight information indicating a transmission weight of terminal #2 as an interference-applying terminal, for terminal #1. Base station 100 generates transmission weight information indicating a transmission weight of terminal #1 as an interference-applying terminal, for terminal #2.

In ST106, base station 100 transmits the transmission weight information generated in ST105 to the corresponding terminal 200. Specifically, base station 100 transmits the transmission weight information indicating the transmission weight of terminal #2 to terminal #1, and transmits the transmission weight information indicating the transmission weight of terminal #1 to terminal #2.

In ST107, base station 100 transmits the CSI-RS to terminals 200 (terminals #1 and #2). In ST108, base station 100 transmits a downlink signal (including a downlink data signal, a DM-RS, and the like. May be referred to as a MU-MIMO transmission signal) to terminals 200 (terminals #1 and #2).

In ST109, transmission weight-information acquisition unit 208 in each of terminals 200 acquires the transmission weight for the interference-applying terminal from the transmission weight information transmitted in ST106. In ST110, CSI-RS channel estimator 206 in each of terminals 200 calculates a CSI channel estimation value based on the CSI-RS transmitted in ST107 (that is, CSI-RS received at a timing when beam forming control is performed).

In ST111, inter-user interference power estimator 209 in each of terminals 200 estimates inter-user interference power based on the transmission weight of the interference-applying terminal acquired in ST109 and the CSI channel estimation value estimated in ST110 (for example, see Expressions (12), (13), and (15)).

In ST112, terminal 200 performs reception processing of the downlink data signal received in ST108, based on the inter-user interference power estimated in ST111. Specifically, signal separator 212 in each of terminals 200 generates the reception weight (see Expression (11)) based on the inter-user interference power (for example, see Expressions (12) and (13)). Signal separator 212 multiplies the reception signal by the reception weight and separates the signal from each other. Demodulator 213 in each of terminals 200 generates the soft decision weight (for example, see Expression (14)) based on the inter-user interference power (for example, see Expression (15)). Demodulator 213 performs weighting on the soft decision value based on the soft decision weight.

As described above, since terminal 200 performs reception processing of a desired signal based on the reception weight and the soft decision weight obtained considering user interference power in each subcarrier and each OFDM symbol, it is possible to reduce inter-user interference and to improve reception quality of the desired signal.

Explanations of Advantageous Effects

As described above, in the exemplary embodiment, in terminal 200, radio receiver 201 receives a plurality of data signals which is transmitted from base station 100 by a MU-MIMO scheme and has been spatially multiplexed. Inter-user interference power estimator 209 estimates inter-user interference power based on a transmission weight of another terminal 200, which is transmitted by a MU-MIMO scheme. Signal separator 212 generates a reception weight based on the inter-user interference power and separates the signal into a plurality of data signals based on the reception weight. Demodulator 213 demodulates each of the plurality of data signals obtained by separation, so as to calculate a soft decision value. Demodulator 213 generates a soft decision weight based on the inter-user interference power and the reception weight and performs weighting on the soft decision value based on the soft decision weight.

Thus, in terminal 200, it is possible to perform reception processing (signal separation and weighting processing on the soft decision value) in consideration of the inter-user interference estimated in each subcarrier. Thus, even in a case where a frequency fluctuates largely as in a multipath environment, terminal 200 can performs reception processing based on the appropriate reception weight and the appropriate soft decision weight in accordance with the practical frequency characteristics. Thus, it is possible to improve reception performance (signal separation performance and decoding performance). Thus, according to the exemplary embodiment, it is possible to effectively reduce inter-user interference in terminal 200.

In the exemplary embodiment, the CSI channel estimation value is fed back in a unit (for example, unit of subband) wider than a subcarrier unit. A control unit of the transmission weight used in base station 100 is also wider than the subcarrier unit. That is, in MU-MIMO transmission, although the reception weight is generated in each subcarrier, the transmission weight is generated in a unit of a plurality of subcarriers (for example, unit of subband). Thus, in the communication system according to the exemplary embodiment, it is possible to suppress an increase of a calculation quantity for controlling the transmission weight on the transmission side (base station 100).

With the above descriptions, according to the exemplary embodiment, it is possible to reduce inter-user interference by suppressing the increase of the calculation quantity.

In the exemplary embodiment, a method of notifying terminal 200 of the transmission weight of the interference-applying terminal from base station 100 is not particularly limited. For example, base station 100 may notify terminal 200 of information indicating the transmission weight itself. Alternatively, base station 100 may convert the transmission weight into a code book and notify terminal 200 of the code book corresponding to the generated transmission weight.

In the exemplary embodiment, as an example, the unit of subband is described as a feedback unit of the CSI channel estimation value and a control unit of the transmission weight. However, the unit is not limited to the unit of subband.

In FIG. 5, MU-MIMO processing for two terminals 200 are illustrated. However, the number of terminals 200 as a target of MU-MIMO is not limited to two.

Exemplary Embodiment 2

Exemplary Embodiment 1 describes a case of notifying the terminal of the transmission weight of an interference-applying terminal, which is used for estimating inter-user interference power, from the base station. On the contrary, this exemplary embodiment describes a case where the terminal estimates the transmission weight of the interference-applying terminal.

That is, base station 100a (not illustrated) according to the exemplary embodiment does not notify the terminal of the transmission weight of the interference-applying terminal.

Thus, base station 100a according to the exemplary embodiment does not include the components (transmission weight-information generator 103, error correction coder 104, and modulator 105) relating to the transmission processing of the transmission weight information in base station 100 (FIG. 2) according to Exemplary Embodiment 1.

Figure 6:
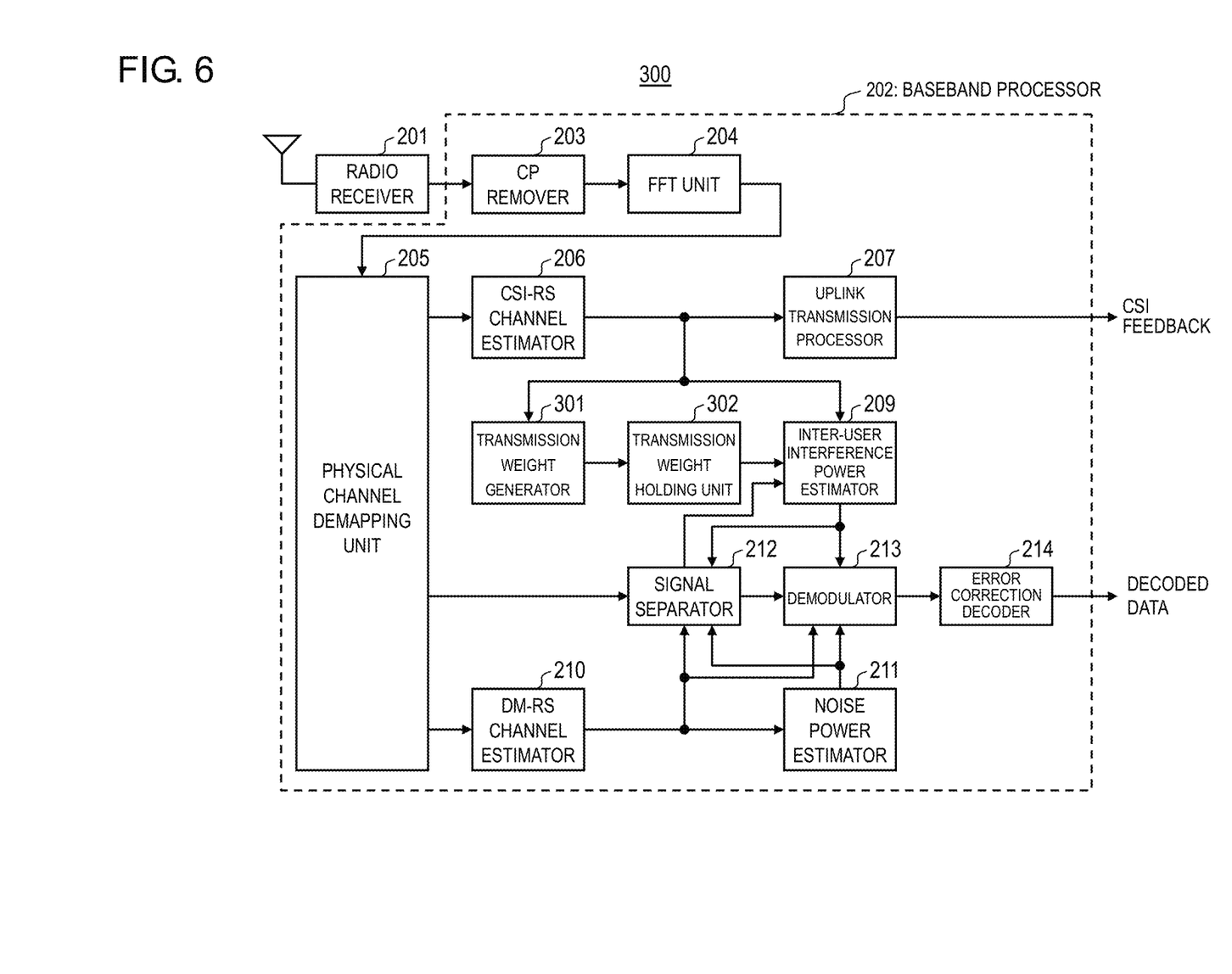
FIG. 6 is a block diagram illustrating a configuration of a terminal according to Exemplary Embodiment 2.

FIG. 6 is a block diagram illustrating an example of a configuration of a terminal 300 according to the exemplary embodiment. In FIG. 6, illustrations are made focusing on components relating to the aspect of the disclosure among components of terminal 300.

In FIG. 6, components that perform pieces of processing similar to those in Exemplary Embodiment 1 (FIG. 3) are denoted by the same reference marks. Descriptions thereof will not be repeated. Specifically, terminal 300 is different from terminal 200 according to Exemplary Embodiment 1 in that transmission weight generator 301 and transmission weight holding unit 302 are provided instead of transmission weight-information acquisition unit 208.

Transmission weight generator 301 generates a transmission weight of an interference-applying terminal based on a CSI channel estimation value input from CSI-RS channel estimator 206.

Terminal 300 generates the transmission weight of the interference-applying terminal in a case of conditions as follows.

Condition 1: Using a block diagonalization (BD) method as a transmission weight generation algorithm Condition 2: Number of terminals in MU-MIMO transmission is two In the BD method, the transmission weight of the interference-applying terminal is calculated from the channel estimation value of a terminal (referred to as an interference target terminal hereinafter) receiving inter-user interference (that is, CSI channel estimation value estimated by CSI-RS channel estimator 206 in terminal 300).

Specifically, in the BD method, in a case where the transmission weight of the interference-applying terminal is calculated, singular value decomposition is performed on the channel estimation value of the interference target terminal, and an eigenvector corresponding to a noise subspace is used as the transmission weight of the interference-applying terminal.

Thus, even though transmission weight generator 301 of terminal 300 does not perform a notification of the transmission weight of the interference-applying terminal from base station 100a, it is possible to generate the transmission weight of the interference-applying terminal based on the channel estimation value (CSI channel estimation value) of the own terminal.

Transmission weight generator 301 outputs the generated transmission weight of the interference-applying terminal to transmission weight holding unit 302.

Transmission weight holding unit 302 holds the transmission weight of the interference-applying terminal, which is input from transmission weight generator 301. Transmission weight holding unit 302 outputs the held transmission weight of the interference-applying terminal to inter-user interference power estimator 209.

The CSI channel estimation value used for generating the transmission weight of the interference-applying terminal in transmission weight generator 301 is fed back to base station 100a and is also used for generating the transmission weight. Transmission weight holding unit 302 outputs the transmission weight of the interference-applying terminal, which has been generated with the CSI channel estimation value, at a transmission timing of downlink data subjected to transmission beam control with the transmission weight calculated from the CSI channel estimation value fed back to base station 100a. Thus, inter-user interference power estimator 209 can estimate inter-user interference power based on the transmission weight of the interference-applying terminal, which has been generated based on the CSI channel estimation value similar to the CSI channel estimation value used in transmission beam control for a downlink data signal transmitted from base station 100a.

Figure 7:
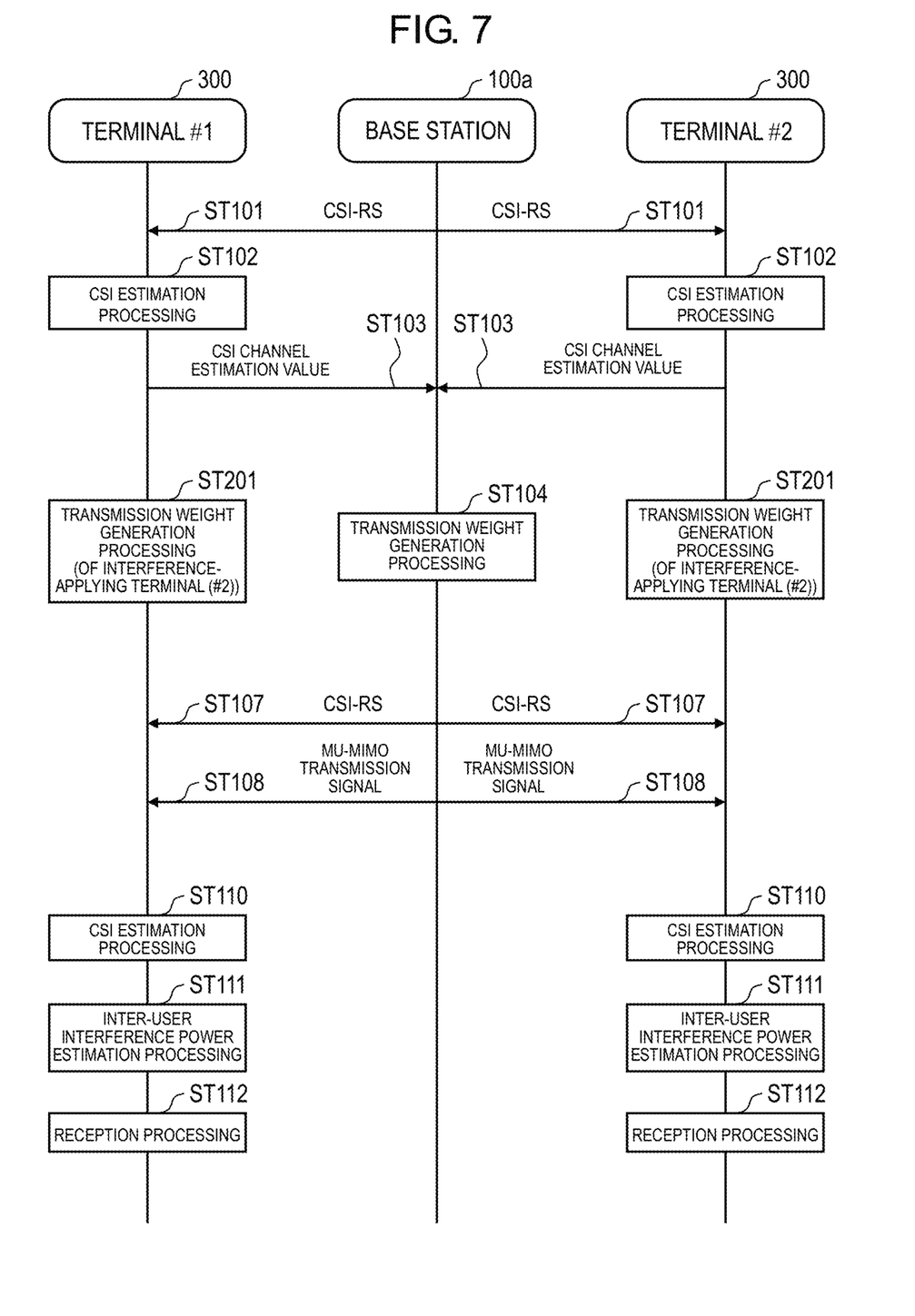
FIG. 7 is a sequence diagram illustrating interference reduction processing according to Exemplary Embodiment 2.

FIG. 7 is a sequence diagram illustrating operation of devices in a communication system according to the exemplary embodiment. In FIG. 7, pieces of processing similar to those in Exemplary Embodiment 1 (FIG. 5) are denoted by the same reference marks. Descriptions thereof will not be repeated.

In FIG. 7, base station 100a does not generate transmission weight information nor perform transmission processing (ST105 and ST106 in FIG. 5), differing from base station 100 according to Exemplary Embodiment 1.

Each terminal 300 (terminal #1 and terminal #2) generates a transmission weight of an interference-applying terminal in ST201. Specifically, transmission weight generator 301 in terminal #1 generates a transmission weight of terminal #2 acting as the interference-applying terminal, based on the CSI channel estimation value estimated in ST102. Similarly, transmission weight generator 301 in terminal #2 generates a transmission weight of terminal #1 acting as the interference-applying terminal, based on the CSI channel estimation value estimated in ST102.

Inter-user interference power estimator 209 in each of terminals 300 estimates inter-user interference power based on the transmission weight of the interference-applying terminal, which has been generated in ST201.

In this manner, in the exemplary embodiment, terminal 300 generates the transmission weight of the interference-applying terminal based on the CSI channel estimation value of the own terminal. Thus, in the exemplary embodiment, it is possible to reduce signaling required for a notification of the transmission weight of the interference-applying terminal, which is used for estimating inter-user interference power, in addition to the advantageous effects in Exemplary Embodiment 1.

Hitherto, the exemplary embodiments according to the aspect of the disclosure are described.

Exemplary Embodiment 1 and Exemplary Embodiment 2 may be appropriately combined and performed. That is, each terminal (terminal 200 or 300) may receive the transmission weight of the interference-applying terminal from base station 100. Each terminal may generate the transmission weight of the interference-applying terminal.

In the exemplary embodiments, a case where terminal 200 or 300 performs channel estimation based on the CSI-RS is described. However, the channel estimation may be based on other reference signals that allows estimation of a channel. For example, it may be based on a cell-specific reference signal (CRS).

In the exemplary embodiments, a case where terminal 200 or 300 generates both the reception weight and the soft decision weight based on the inter-user interference power is described. However, the disclosure is not limited thereto. For example, terminal 200 or 300 may generate any one of the reception weight and the soft decision weight based on the inter-user interference power.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal includes: a receiver, which, in operation receives a plurality of data signals transmitted from a base station by a multi user-multiple input multiple output (MU-MIMO) scheme, the plurality of data signals being spatially multiplexed; an estimator, which, in operation estimates inter-user interference power based on a transmission weight of another terminal with which the MU-MIMO scheme is performed; and a signal separator, which, in operation generates a reception weight based on the inter-user interference power and separates the plurality of data signals from each other based on the reception weight.

The terminal may further include: a demodulator, which, in operation demodulates each of the plurality of data signals separated by the signal separator so as to calculate a soft decision value, generates a soft decision weight based on the inter-user interference power and the reception weight, and performs weighting on the soft decision value based on the soft decision weight.

In the terminal, the estimator may estimate the inter-user interference power for each subcarrier, and the signal separator may generate the reception weight for each subcarrier.

In the terminal, the demodulator may generate the soft decision weight for each subcarrier.

The terminal may further include: an acquisition unit, which, in operation acquires a control signal including information regarding the transmission weight of the other terminal, from the base station.

The terminal may further include: a generator, which, in operation generates the transmission weight of the other terminal based on a channel estimation value between the base station and the terminal.

A communication method includes: receiving a plurality of data signals transmitted from a base station by a multi user-multiple input multiple output (MU-MIMO) scheme, the plurality of data signals being spatially multiplexed; estimating inter-user interference power based on a transmission weight of another terminal with which the MU-MIMO scheme is performed; and generating a reception weight based on the inter-user interference power and separating the plurality of data signals from each other based on the reception weight.

The communication method may further include: demodulating each of the plurality of data signals separated in the separating so as to calculate a soft decision value, generating a soft decision weight based on the inter-user interference power and the reception weight, and performing weighting on the soft decision value based on the soft decision weight.

What is claimed is:

1. A terminal comprising:
   a receiver, which, in operation receives a plurality of data signals transmitted from a base station by a multi user-multiple input multiple output (MU-MIMO) scheme, the plurality of data signals being spatially multiplexed;
   an estimator, which, in operation estimates inter-user interference power based on a transmission weight of another terminal with which the MU-MIMO scheme is performed;
   a signal separator, which, in operation generates a reception weight based on the inter-user interference power and separates the plurality of data signals from each other based on the reception weight; and
   a demodulator, which, in operation demodulates each of the plurality of data signals separated by the signal separator so as to calculate a soft decision value, generates a soft decision weight based on the inter-user interference power.

2. The terminal of claim 1, wherein the
   demodulator, which, in operation further generates the soft decision weight based on the reception weight, and performs weighting on the soft decision value based on the soft decision weight.

3. The terminal of claim 1,
wherein the estimator estimates the inter-user interference power for each subcarrier, and
the signal separator generates the reception weight for each subcarrier.

4. The terminal of claim 2,
wherein the demodulator generates the soft decision weight for each subcarrier.

5. The terminal of claim 1, further comprising:
an acquisition unit, which, in operation acquires a control signal including information regarding the transmission weight of the other terminal, from the base station.

6. The terminal of claim 1, further comprising:
a generator, which, in operation generates the transmission weight of the other terminal based on a channel estimation value between the base station and the terminal.

7. A communication method comprising:
receiving a plurality of data signals transmitted from a base station by a multi user-multiple input multiple output (MU-MIMO) scheme, the plurality of data signals being spatially multiplexed;
estimating inter-user interference power based on a transmission weight of another terminal with which the MU-MIMO scheme is performed;
generating a reception weight based on the inter-user interference power and separating the plurality of data signals from each other based on the reception weight;
demodulating each of the plurality of data signals separated in the separating so as to calculate a soft decision value; and
generating a soft decision weight based on the inter-user interference power.

8. The communication method of claim 7, further comprising:
generating the soft decision weight based on the reception weight; and
performing weighting on the soft decision value based on the soft decision weight based on the inter-user interference power and the reception weight.

* * * * *